UNITED STATES PATENT OFFICE.

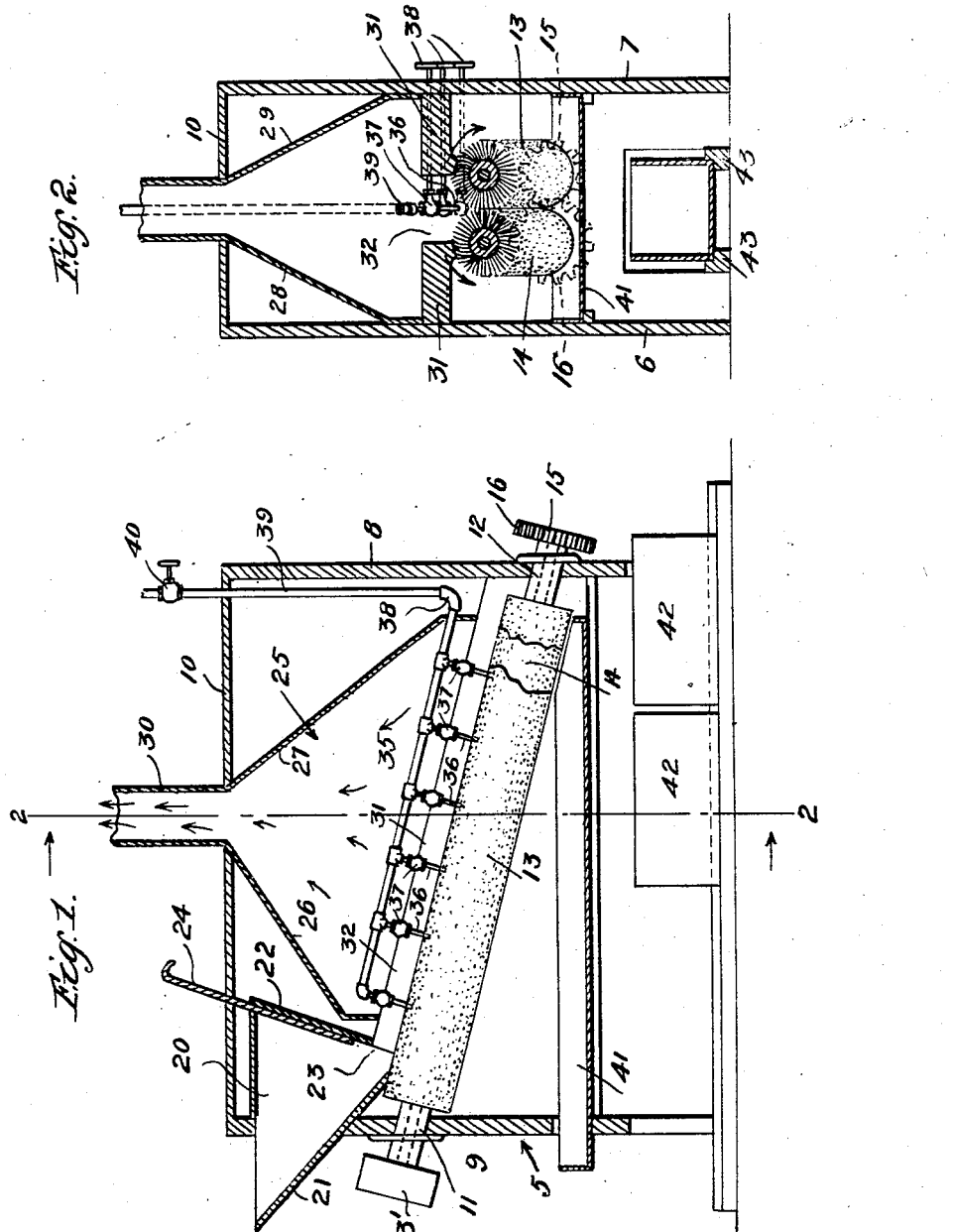

HOMER L. COLE AND FERN S. BISHOP, OF SANTA ANA, CALIFORNIA.

NUT-MEAT-CLEANING APPARATUS.

1,279,844.  Specification of Letters Patent.  Patented Sept. 24, 1918.

Application filed February 7, 1918. Serial No. 215,742.

*To all whom it may concern:*

Be it known that we, HOMER L. COLE and FERN S. BISHOP, both citizens of the United States, residing at Santa Ana, in the county of Orange, State of California, have invented new and useful Improvements in Nut-Meat-Cleaning Apparatus, of which the following is a specification.

Our invention has relation more specifically to a power actuated apparatus for removing deleterious substances from the meats or kernels of nuts.

It is an object of our invention to provide a power actuated apparatus that will quickly and effectually clean the meats of nuts and render them merchantable.

A further object of our invention is to provide an apparatus through which nut meats in large quantities may be quickly passed and cleaned without injury thereto.

It has been the practice in preparing nuts of different varieties for the market, and especially English walnuts, to sort them so as to remove light weight, under-size and discolored nuts, commonly known as culls. After the removal of the culls from the sound merchantable nuts, the same are cracked and the meats extracted therefrom. Often the meats from the culls are in a moldy condition, and contain foreign matter such as shell particles, worm eggs and discolorations which render them unfit for sale or consumption.

By means of our present invention we are enabled to completely remove from the infected or discolored cull meats all imperfections, and thereby render them commercially valuable for food purposes.

We have illustrated an embodiment of the invention in the accompanying drawings, in which:

Figure 1 is a longitudinal section through our apparatus.

Fig. 2 is a transverse section through our apparatus taken on line 2—2 of Fig. 1.

Referring more particularly to the drawing, 5 designates a frame which preferably consists of a box-like structure having side walls 6, 7, end walls 8, 9, and a top or cover 10. Mounted in end walls 8 and 9 of said structure are bearings 11 and 12 in which are disposed a pair of revoluble roller brushes 13 and 14. These roller brushes are inclined from one end to the other and together form a conveying way for the nut meats which are fed thereto, as will be more particularly described hereinafter.

The higher end of roll 13 is provided with a pulley 13' which may be belted to any suitable source of power, not shown. The lower end of the roll is provided with a gear wheel 15 which meshes with a similar gear 16 secured to the lower end of its companion roll. Gear 14 is of slightly less diameter than gear 16 so that the two rolls will be rotated at different speeds relative to each other. By rotating the rolls at different speeds the nut kernels or meats which are fed thereto will be turned over and over during their course from the upper end of the conveying way to its lower discharge end, thus presenting all surfaces of the nut meats to the action of the cleaning agent.

Affixed in the end wall 9 of the structure 5 and at the top thereof is a feed hopper 20 into which the uncleaned nut meats are deposited. The front and rear walls 21 and 22 of hopper 20 are inclined downwardly, and toward each other as clearly shown in Fig. 1 of the drawings, and terminate between the upper ends of rolls 11 and 12, a discharge opening 23 being provided in the lower end of wall 22, controlled by a slide gate 24 to regulate the flow of nut meats from the hopper to the rolls.

Mounted within structure 5 is an air suction casing 25 having downwardly and outwardly inclined side and end walls 26, 27, 28 and 29; the upper end of said walls terminating in a vertically disposed suction tube 30 which leads to a suction fan of any well known type, not shown. Casing 25 is provided with a bottom wall 31 having a centrally disposed longitudinal slot 32 disposed therein; the side walls of the slot 32 being approximately over the center of each of rolls 13 and 14; the rolls contacting with the edges so that any foreign substances removed from the nut meats will be scraped therefrom and carried by suction upwardly through tube 30 and deposited in any convenient place.

Mounted within suction chamber 25 and extending parallel with the axis of rolls 11 and 12 is a compressed air pipe having a plurality of air jets 36, each of said jets having a controlling valve 37. The operating handles 38 of the jet valves 37 extend without structure 5 so that the compressed air delivered by pipe 36 may be effectually controlled. Connected to the lower end of compressed air pipe 35 by means of an elbow 38 is a vertically disposed compressed air supply pipe 39 which extends upwardly and out of structure 5 to a source of supply not shown; a controlling valve 40 being interposed said pipe line for regulating the air pressure supplied to the compressed air pipe 35.

Mounted within structure 5 and directly beneath both rolls is a tray 41 adapted to receive the heavy particles that may be removed from the nut kernels during a cleaning operation. The lower end of rolls 11 and 12 terminate short of end wall 8 so that the nut meats after being cleaned may be discharged therefrom, suitable nut receiving boxes 42 being disposed directly beneath the lower ends of said rolls and mounted to slide on tracks 43.

The operation of our apparatus is as follows: Power is applied to the roller brushes through the medium of the pulley mounted on the upper end of one of the rolls, and a quantity of nut meats is supplied to the hopper. The feed gate being disposed over the hopper discharge opening so as to regulate the flow of the meats to the roller brushes. As the rolls are inclined from their top ends downwardly to their discharge ends, and further, that they rotate at different speeds, the nut meats will be carried downwardly, the brushes rotating in a direction indicated by the arrows in Fig. 1. As the brushes rotate the meats are turned so that all of the surfaces are exposed to the action of the compressed air jets, which are disposed directly over and between the brushes. These air jets deliver a pressure of not less than one hundred pounds per square inch so that any foreign substance or mold adhering to the surface of the nut meats are disintegrated and blown therefrom, the suction through the air suction casing 25 instantly drawing the detached particles that are detached from the meats upwardly into a suitable receptacle not shown. The speed of the roller brushes may be varied according to the character of the nut meats, that is to say, whether a longer or less exposure to the air jets is necessary to detach the foreign or undesirable portions therefrom.

It will thus be seen that by employing pneumatic pressure instead of mechanical means that no injury to the nut meats will result from the cleaning operation, and the nut meats after a treatment by the machine will issue therefrom in perfect condition for the market.

What we claim is:

1. In an apparatus of the class described, a suitable frame, conveying rollers disposed therein, a feed hopper mounted adjacent one of the ends of said rollers, means to direct compressed air against said rolls, a suction means mounted over said rolls for removing the particles detached by said compressed air means, and means to rotate said rollers.

2. In an apparatus of the class described, a suitable frame, a pair of inclined conveying roller brushes disposed therein, a feed hopper mounted adjacent the upper ends of said rollers, said feed hopper having a discharge outlet at its lower end, means to control said discharge outlet, a plurality of compressed air jets mounted above said roll and directing air against said rollers, a suction box mounted in said frame above said rollers and having a discharge outlet leading therefrom, and means to rotate said rollers.

3. An apparatus of the class described, comprising a pair of inclined rolls geared together and motive means therefor, a feed hopper mounted adjacent the upper end of said rolls, a plurality of compressed air jets mounted in said frame adjacent said rolls, said air jets directing compressed air toward the surface of said rolls, means to control the air from each of said jets independently of each other, means to control the supply of air to said jets, and an air suction box disposed in said frame over said rolls for removing particles detached by said compressed air means.

In witness that we claim the foregoing we have hereunto subscribed our names this 14th day of January, 1918.

HOMER L. COLE.
FERN S. BISHOP.